(12) United States Patent
Murschall et al.

(10) Patent No.: US 7,157,132 B2
(45) Date of Patent: *Jan. 2, 2007

(54) TRANSPARENT, SEALABLE, FLAME-RETARDANT POLYESTER FILM, METHOD FOR THE PRODUCTION AND USE THEREOF

(75) Inventors: Ursula Murschall, Nierstein (DE); Ulrich Kern, Ingelheim (DE); Andreas Stopp, Ingelheim (DE); Guenther Crass, Taunusstein (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 362 days.

This patent is subject to a terminal disclaimer.

(21) Appl. No.: 10/182,538

(22) PCT Filed: Jan. 10, 2001

(86) PCT No.: PCT/EP01/00207

§ 371 (c)(1),
(2), (4) Date: Jul. 26, 2002

(87) PCT Pub. No.: WO01/60612

PCT Pub. Date: Aug. 23, 2001

(65) Prior Publication Data

US 2003/0054169 A1    Mar. 20, 2003

(30) Foreign Application Priority Data

Feb. 19, 2000   (DE) ............................... 100 07 726

(51) Int. Cl.
| | |
|---|---|
| B32B 27/08 | (2006.01) |
| B32B 27/18 | (2006.01) |
| B32B 27/20 | (2006.01) |
| B32B 27/36 | (2006.01) |
| B32B 37/15 | (2006.01) |

(52) U.S. Cl. .................... 428/141; 428/343; 428/346; 428/347; 428/349; 428/212; 428/213; 428/214; 428/215; 428/216; 428/323; 428/331; 428/480; 428/910; 264/288.4; 264/290.2

(58) Field of Classification Search ............... 428/480, 428/910, 323, 331, 343, 346, 347, 349, 212, 428/213, 214.215, 216; 264/288.4, 290.2; 106/15.05
See application file for complete search history.

(56) References Cited

U.S. PATENT DOCUMENTS

| | | | | |
|---|---|---|---|---|
| 4,375,494 A | * | 3/1983 | Stokes ........................ | 428/323 |
| 5,173,357 A | * | 12/1992 | Nakane et al. .............. | 428/220 |
| 5,521,236 A | * | 5/1996 | Moy et al. ................... | 524/101 |
| 5,846,642 A | * | 12/1998 | Kimura et al. .............. | 428/323 |
| 5,889,096 A | * | 3/1999 | Imashiro et al. ............ | 524/195 |
| 5,955,181 A | * | 9/1999 | Peiffer et al. ............... | 428/212 |
| 6,270,888 B1 | * | 8/2001 | Rutter et al. ................ | 428/347 |
| 6,383,585 B1 | * | 5/2002 | Peiffer et al. .............. | 428/35.9 |
| 6,423,401 B1 | * | 7/2002 | Peiffer et al. ............... | 428/216 |
| 6,797,358 B1 | * | 9/2004 | Murschall et al. .......... | 428/141 |
| 6,797,359 B1 | * | 9/2004 | Janssens et al. ............ | 428/141 |
| 6,841,222 B1 | * | 1/2005 | Murschall et al. .......... | 428/141 |
| 6,855,395 B1 | * | 2/2005 | Janssens et al. ............ | 428/141 |
| 6,872,461 B1 | * | 3/2005 | Murschall et al. .......... | 428/480 |
| 2002/0114944 A1 | * | 8/2002 | Peiffer et al. ............... | 428/336 |
| 2002/0150751 A1 | * | 10/2002 | Murschall et al. .......... | 428/331 |
| 2003/0054129 A1 | * | 3/2003 | Murschall et al. ............ | 428/97 |
| 2003/0099846 A1 | * | 5/2003 | Murschall et al. .......... | 428/458 |
| 2003/0118817 A1 | * | 6/2003 | Murschall et al. .......... | 428/395 |

FOREIGN PATENT DOCUMENTS

| | | | |
|---|---|---|---|
| DE | 23 46 787 A1 | | 3/1975 |
| EP | 0 006 686 A2 | | 1/1980 |
| EP | 0 031 202 A2 | | 7/1981 |
| EP | 0 031 203 A2 | | 7/1981 |
| EP | 0 035 835 A1 | | 9/1981 |
| EP | 0 076 582 A1 | | 4/1983 |
| EP | 0 306 675 A2 | | 3/1989 |
| EP | 0 432 886 A2 | | 6/1991 |
| EP | 0 515 096 A2 | | 11/1992 |
| EP | 0 785 067 A1 | | 7/1997 |
| GB | 1 465 973 | | 3/1997 |
| GB | 2 344 596 A | * | 6/2000 |
| WO | WO 98/06575 A1 | | 2/1998 |

OTHER PUBLICATIONS

Schimtz, Peter et al., "Films." Ullmann's Encyclopedia of Industrial Chemistry, 5th Ed., vol. A11 (1988), pp. 85-95, 108-110.*
Werner, Eberhard et al., "Polyester, Films." Encyclopedia of Polymer Science and Engineering, vol. 12 (1988), pp. 193-216.*
W. Eberhard, S. Janocha, M.J. Hopper, K.J. Mackenzie, "Polyester Films", Encyclopedia of Polymer Science & Engineering, 1988, vol. 12, 2, 193-216, John Wiley & Sons.
H. Day, D. M. Wiles, Journal Applied Polymer Science, 1972, vol. 16, p. 203, 1972.

* cited by examiner

*Primary Examiner*—Vivian Chen
(74) *Attorney, Agent, or Firm*—ProPat, L.L.C.

(57) ABSTRACT

Biaxially oriented, co-extruded polyester films comprising a base layer consisting of at least 90 wt. % thermoplastic polyester, preferably polyethylene terephthalate (PET), at least one sealable outer layer and a second non-sealable outer layer and, optionally, other intermediate layers, in addition to at least one flame-retardant agent, preferably organic phosphorous compounds. The inventive films are characterized by low inflammability, high UV stability, no embrittlement when subjected to thermal stress and a surface which is devoid of troublesome opacity. They are suitable for a multiplicity of uses both indoors and outside. The outer layers contain anti-blocking agents such as silicic acid having an average particle diameter of preferably less than 50 nm and/or 2 µm. Preferably, the sealable outer layer consists of a copolyester which is made of ethylene terephthalate and ethylene isophthalate units.

32 Claims, No Drawings

US 7,157,132 B2

TRANSPARENT, SEALABLE, FLAME-RETARDANT POLYESTER FILM, METHOD FOR THE PRODUCTION AND USE THEREOF

The invention relates to a transparent, UV-resistant and flame-retardant, sealable, biaxially oriented polyester film composed of at least one base layer B and, applied to the two sides of this base layer, outer layers A and C. The film also comprises at least one light stabilizer which is a UV stabilizer and at least one flame retardant. The invention further relates to the use of the film and to a process for its production.

BACKGROUND OF THE INVENTION

The films are particularly suitable for outdoor applications, e.g. for greenhouses, and roofing systems. The films are also highly suitable for protective coverings, and therefore for the protection of metallic surfaces, to which the films may be hot-sealed. After even a short period in outdoor applications, films in which no UV-absorbing materials are present exhibit yellowing and impairment of mechanical properties, due to photooxidative degradation by sunlight. The films and items produced therefrom are moreover particularly suitable for applications where fire protection or flame retardancy is demanded.

Sealable, biaxially oriented polyester films are known from the prior art. There are also known sealable, biaxially oriented polyester films which have one or more UV absorbers. These films known from the prior art either have good sealing performance, or good optical properties, or acceptable processing performance.

GB-A 1 465 973 describes a coextruded, two-layer polyester film, one layer of which is composed of isophthalic acid-containing copolyesters and of terephthalic-acid-containing copolyesters and the other layer of which is composed of polyethylene terephthalate. No useful information is given concerning the sealing performance of the film. Due to lack of pigmentation, the film is not capable of production by a reliable process, i.e. is not capable of winding and has only limited further processing capability.

EP-A 0 035 835 describes a coextruded, sealable polyester film whose sealable layer comprises particles whose average particle size exceeds the thickness of the sealable layer, to improve winding and processing performance. The particulate additives form surface protrusions which inhibit undesired blocking and adhesion of the film to rollers or guides. No further detail is given concerning incorporation of antiblocking agents in the other, nonsealable, layer of the film. It is uncertain whether this layer comprises antiblocking agents. The selection of particles whose diameter is greater than the thickness of the sealable layer, with the concentrations given in the examples, impairs the sealing performance of the film. No information is given concerning the sealing temperature range of the film. The seal seam strength is measured at 140° C. and is in the range from 63 to 120 N/m (from 0.97 N/15 mm to 1.8 N/15 mm of film width).

EP-A 0 432 886 describes a coextruded multilayer polyester film which has a first surface on which a sealable layer has been arranged and which has a second surface on which an acrylate layer has been arranged. Here again, the sealable outer layer may be composed of isophthalic-acid-containing and terephthalic-acid-containing copolyesters. The coating on the reverse side gives the film improved processing performance. No information is given concerning the sealing temperature range of the film. Seal seam strength is measured at 140° C. For a sealable layer of thickness 11 µm the seal seam strength given is 761.5 N/m (11.4 N/15 mm). A disadvantage of the acrylate coating on the reverse side is that this side loses sealability with respect to the sealable outer layer. The film therefore has very restricted use.

EP-A 0 515 096 describes a coextruded, multilayer sealable polyester film which comprises an additional additive on the sealable layer. The additive may, for example, comprise inorganic particles, and is preferably applied in an aqueous layer to the film during its production. The intended result is that the film retains its good sealing properties and has good processability. Only very few particles are present in the reverse side, and these mainly pass into this layer via the regrind. This specification again gives no information concerning the sealing temperature range of the film. Seal seam strength is measured at 140° C. and is more than 200 N/m (3 N/15 mm). The seal seam strength given for a sealing layer of 3 µm thickness is 275 N/m (4.125 N/15 mm).

WO 98/06575 describes a coextruded multilayer polyester film which comprises a sealable outer layer and a nonsealable base layer. This base layer may have been built up from one or more layers, the inward-facing layer of these being in contact with the sealable layer. The other (outward-facing) layer then forms the second nonsealable outer layer. Here again, the sealable outer layer may be composed of isophthalic acid-containing and terephthalic-acid-containing copolyesters, but no antiblocking particles are present in these. The film also comprises at least one UV absorber, added to the base layer in a ratio by weight of from 0.1 to 10%. The UV absorbers used here preferably comprise triazines, e.g. Tinuvin® 1577 from Ciba. The base layer has conventional antiblocking agents. The film has good sealability, but does not have the desired processing performance and also has shortcomings in optical properties, such as gloss and haze.

DE-A 23 46 787 describes a flame-retardant polymer. Besides the polymer, its use for the production of films and fibers is also described. When this phospholane-modified polymer is used for film production the following shortcomings are apparent.

The polymer mentioned is susceptible to hydrolysis and has to be very effectively predried. When the polymer is dried using dryers of the prior art it cakes, and production of a film is therefore possible only under extremely difficult conditions.

The resultant films produced under uneconomic conditions embrittle when exposed to heat, i.e. their mechanical properties are impaired by embrittlement, so that the film is unusable. This embrittlement arises after as little as 48 hours of exposure to heat.

It was an object of the present invention to provide a transparent, UV-resistant, flame-retardant, sealable and biaxially oriented polyester film which does not have the disadvantages of the films mentioned of the prior art and in particular has the combination of advantageous properties represented by very good sealability, cost-effective production, improved processability and improved optical properties.

It was an object of the present invention to extend the sealing temperature range of the film to low temperatures, to increase the seal seam strength on the film, and at the same time provide film handling which is better than that known from the prior art. It was also to be ensured that the processability of the film extend to high-speed processing machinery. During film production it should be possible to introduce directly arising regrind at a concentration of up to 60% by weight, based on the total weight of the film, into the extrusion process without any significant resultant adverse effect on the physical properties of the film.

Since the film is intended in particular for outdoor applications and/or critical indoor applications, it should have high UV resistance. High UV resistance means that sunlight or other UV radiation causes no, or only extremely little, damage to the films. In particular, the films are not to yellow after some years in outdoor applications, nor embrittle, nor exhibit surface cracking, nor undergo any impairment of mechanical properties. High UV resistance means that the film absorbs UV light and transmits light only when the visible region has been reached.

Flame retardancy means that in what is known as a fire protection test the transparent film complies with the conditions of DIN 4102 Part 2 and in particular the conditions of DIN 4102 Part 1, and can be allocated to construction materials classes B2 and in particular B1 for low-flammability materials.

The film is also intended to pass the UL-94 test (Vertical Burning Test for Flammability of Plastic Material) and therefore to be capable of grading in class 94 VTM-0. This means that burning of the film has ceased 10 seconds after the bunsen burner has been removed, and that after 30 seconds no smoldering is observed, and there are no burning drops.

Cost-effective production includes the capability of the raw materials or raw material components needed for production of the flame-retardant film to be dried using industrial dryers of the prior art. It is important that the raw materials do not cake and do not undergo thermal degradation. These industrial dryers of the prior art include vacuum dryers, fluidized-bed dryers, and fixed-bed dryers (tower dryers).

These dryers operate at temperatures of from 100 to 170° C., at which the flame-retardant polymers mentioned in the prior art cake, making film production impossible.

In the vacuum dryer which provides the mildest drying conditions, the raw material for the film traverses a temperature range from about 30 to 130° C. under a vacuum of 50 mbar. After this, a process known as postdrying is required in a hopper at temperatures of from 100 to 130° C., with a residence time of from 3 to 6 hours. Even here, the raw material mentioned cakes to an extreme extent.

No embrittlement or exposure to heat means that after 100 hours of heat-conditioning at 100° C. in a circulating-air oven the film has not embrittled and does not have disadvantageous mechanical properties.

Good mechanical properties include high modulus of elasticity ($E_{MD}$>3200 N/mm$^2$; $E_{TD}$>3500 N/mm$^2$) and also good values for tensile stress at break (in MD>100 N/mm$^2$; in TD>130 N/mm$^2$).

BRIEF DESCRIPTION OF THE INVENTION

According to the invention, the object is achieved by providing a flame-retardant, UV-resistant, biaxially oriented, sealable polyester film with at least one base layer B, and with a sealable outer layer A, and with another outer layer C located on the other side of the base layer B, where the sealable outer layer A preferably has a minimum sealing temperature of less than 110° C. and preferably has a seal seam strength of at least 1.3 N/15 mm, and where the film comprises at least one UV absorber or a mixture of various UV absorbers, and at least one flame retardant or a mixture of various flame retardants.

DETAILED DESCRIPTION OF THE INVENTION

The UV stabilizer is advantageously fed directly as a masterbatch during film production, the concentration of the UV stabilizer preferably being from 0.01 to 5% by weight, based on the weight of the layers comprising the UV absorber.

The flame retardant present in the film of the invention is preferably added by what is known as masterbatch technology directly during film production, the concentration of the flame retardant being from 0.5 to 30% by weight, preferably from 1 to 20% by weight, based on the weight of the layers in which the flame retardant is present.

According to the invention, the film preferably has three layers, the layers then encompassed being the base layer B, the sealable outer layer A, and the nonsealable outer layer C. The film of the invention may have additional intermediate layers.

The base layer B of the film is composed of a thermoplastic, preferably of at least 90% by weight of a thermoplastic polyester. Polyester suitable for this purpose are those made from ethylene glycol and terephthalic (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, in particular at least 95 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layers A and/or C.

Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$–C$_{19}$ alkanediacids are particularly suitable, and the alkane moiety here may be straight-chain or branched.

One way of preparing these polyesters according to the invention is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols (W. Eberhard, S. Janocha, M. J. Hopper, K. J. Mackenzie, "Polyester Films", in Encyclopaedia of Polymer Science & Engineering Volume 12, 2,193–216 (1988), John Wiley & Sons).

The sealable outer layer A applied by coextrusion to the base layer B has been built up on the basis of polyester copolymers and essentially consists of copolyesters composed predominantly of isophthalic acid units and of terephthalic acid units, and of ethylene glycol units. The remaining monomer units derive from other aliphatic, cycloaliphatic or aromatic diols and, respectively, dicarboxylic acids, as may also occur in the base layer. Preferred copolyesters are those which have been built up from ethylene terephthalate units and from ethylene isophthalate units. The proportion of ethylene terephthalate is preferably from 40 to 95 mol %, and the corresponding proportion of ethylene isophthalate is preferably from 60 to 5 mol %. Particular preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

For the other, nonsealable outer layer C, or for any intermediate layers present, use may in principle be made of the polymers described above for the base layer B.

The desired sealing and processing properties of the film of the invention are obtained from the combination of properties of the copolyester used for the sealable outer layer and from the topographies of the sealable outer layer A and the nonsealable outer layer C.

The minimum sealing temperature of preferably below 110° C. and the seal seam strength of preferably at least 1.3 N/15 mm are achieved when the copolymers described in more detail above are used for the sealable outer layer A. The films have their best sealing properties when no other additives, in particular no inorganic or organic fillers, are added to the copolymer. In this case, with the copolyester given above, the lowest minimum sealing temperature and the highest seal seam strengths are obtained. However, the handling of the film is poorer in this case, since the surface of the sealable outer layer A tends to block. The film can hardly be wound and has little suitability for further processing on high-speed packaging machinery. To improve handling of the film, and processability, it is necessary to modify the sealable outer layer A. This is best done with the aid of suitable antiblocking agents of a selected size, which are added to the sealable layer at a particular concentration, and specifically in such a way as to firstly minimize blocking and secondly give only insignificant impairment of sealing properties. This desired combination of properties can be achieved in particular when the topography of the sealable outer layer A is characterized by the following set of parameters:

The roughness of the sealable outer layer, characterized by the $R_a$ value, should be less than 30 nm, otherwise the sealing properties are adversely affected for the purposes of the present invention.

The value measured for gas flow should be from 500–4 000 s. At values below 500 s the sealing properties are adversely affected for the purposes of the present invention, and at values above 4 000 s the handling of the film becomes poor.

For further improvement in the processing performance of the sealable film, the topography of the nonsealable outer layer C should be characterized by the following set of parameters:

The coefficient of friction (COF) of this side with respect to itself should be below 0.5, otherwise the winding performance and further processing of the film are unsatisfactory.

The roughness of the nonsealable outer layer, characterized by the $R_a$ value, should be above 40 nm and below 100 nm. Values below 40 nm have an adverse effect on the winding and processing performance of the film, and values above 100 nm impair the optical properties (gloss, haze) of the film.

The value measured for gas flow should be below 120 s. At values above 120 s the winding and processing performance of the film is adversely affected.

The number of elevations N per mm$^2$ of film surface has the following correlation with their respective heights h:

$$0.29-3.30*\log h/\mu m < \log N/mm^2 < 1.84-2.70*\log h/\mu m$$

$$0.01\ \mu m < h < 10\ \mu m$$

If the values for N are below those corresponding to the left-hand side of the equation, the winding and processing performance of the film is adversely affected, and if the values for N are above those corresponding to the right-hand side of the equation, the gloss and haze of the film are adversely affected.

The UV stabilizers selected for rendering the film of the invention UV-resistant may in principle be any organic or inorganic UV stabilizer suitable for incorporation within polyesters. Suitable UV stabilizers of this type are known from the prior art and are described in more detail in WO 98/06575, in EP-A-0 006 686, in EP-A-0 031 202, EP-A-0 031 203 or in EP-A-0 076 582, for example.

Light, in particular the ultraviolet content of solar radiation, i.e. the wavelength region from 280 to 400 nm, causes degradation in thermoplastics, the results of which are not only a change in appearance due to color change or yellowing, but also an adverse effect on mechanical and physical properties.

The inhibition of this photooxidative degradation is of considerable industrial and economic importance, since without it many thermoplastics have drastically reduced scope of application.

The absorption of UV light by polyethylene terephthalates for example, starts at below 360 nm, increases markedly below 320 nm and is very pronounced at below 300 nm. Maximum absorption occurs at between 280 and 300 nm.

In the presence of oxygen it is mainly chain cleavage which occurs, but without crosslinking. The predominant photooxidation products in quantity terms are carbon monoxide, carbon dioxide and carboxylic acids. Besides the direct photolysis of the ester groups, consideration has to be given to oxidation reactions which proceed via peroxide radicals, again to form carbon dioxide.

In the photooxidation of polyethylene terephthalates there can also be cleavage of hydrogen at the position α to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent, matt films are those organic or organometallic compounds which produce no, or only extremely slight, color or color change in the thermoplastic to be stabilized, i.e. are soluble in the thermoplastic.

For the purposes of the present invention, light stabilizers which are suitable UV stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., i.e. do not decompose and do not cause evolution of gas. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoates, sterically hindered amines and triazines, preferably the 2-hydroxybenzotriazoles and the triazines.

In one very particularly preferred embodiment, the film of the invention comprises from 0.01 to 5.0% by weight of 2-(4,6-diphenyl-1,3,5-triazin-2-yl)-5-hexyloxyphenol of the formula

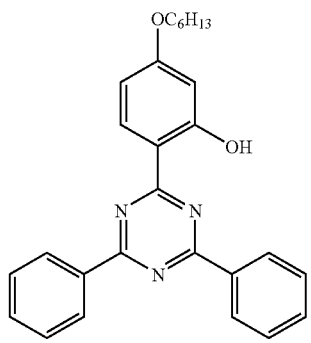

or from 0.01 to 5.0% by weight of 2,2-methylenebis(6-(2H-benzotriazol-2-yl)-4-(1,1,2,2-tetramethylpropyl)phenol) of the formula

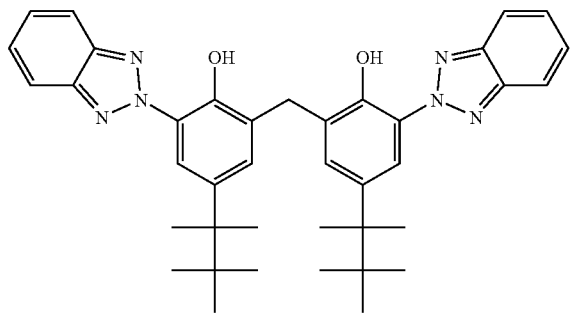

In one preferred embodiment, it is also possible to use a mixture of these two UV stabilizers or a mixture of at least one of these two UV stabilizers with other UV stabilizers, and here the total concentration of light stabilizer is preferably from 0.01 to 5.0% by weight, based on the weight of crystallizable polyethylene terephthalate.

In the three-layer embodiment, the UV stabilizer is preferably present in the nonsealable outer layer C. However, if required, the base layer B and/or the sealable outer layer A and/or, if desired, any intermediate layers present may also have UV stabilizers. The concentration of the stabilizer(s) here is based on the weight of the layers which have UV stabilizers.

Surprisingly, weathering tests to the test specification ISO 4892 using the Atlas Ci65 Weather-Ometer have shown that, to improve UV resistance, in the case of the abovementioned three-layer film it is fully sufficient for the outer layers of preferred thickness from 0.3 to 2.5 μm to have UV stabilizers.

Weathering tests have moreover shown that when films have been rendered UV-resistant according to the invention they generally show no yellowing, no embrittlement, no loss of surface gloss, no surface-cracking and no impairment of mechanical properties even after an extrapolated 5 to 7 years of outdoor application in weathering tests.

The light stabilizer may advantageously be fed before the material leaves the thermoplastic polymer producer, or metered into the extruder during film production.

Addition of the light stabilizer by way of masterbatch technology is particularly preferred. The light stabilizer is dispersed in a solid carrier material. Carrier materials which may be used are the actual polyester used or else other polymers sufficiently compatible therewith.

In masterbatch technology it is important that the particle size and the bulk density of the masterbatch are similar to the particle size and the bulk density of the polyester, so that uniform distribution can take place, giving uniform UV resistance.

The film of the invention comprises at least one flame retardant, fed directly during film production by way of what is known as masterbatch technology, the concentration of the flame retardant being in the range from 0.5 to 30.0% by weight, preferably from 1.0 to 20.0% by weight, based on the weight of the layer of the crystallizable thermoplastic. The ratio of flame retardant to thermoplastic maintained during production of the masterbatch is generally from 60:40% by weight to 10:90% by weight.

Typical flame retardants include bromine compounds, chloroparaffins, and other chlorine compounds, antimony trioxide, and aluminum trihydridates, the halogen compounds being disadvantageous due to the halogen-containing by-products produced. The low lightfastness of a film provided therewith is also distinctly disadvantageous, as is the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise the optical properties demanded are not complied with.

Since the flame retardant generally has some susceptibility to hydrolysis, it can be advisable to make additional use of a hydrolysis stabilizer.

The hydrolysis stabilizers generally used are phenolic stabilizers, alkali metal/alkaline earth metal stearates, and/or alkali metal/alkaline earth metal carbonates, in amounts of from 0.01 to 1.0% by weight. The amounts used as phenolic stabilizers are from 0.05 to 0.6% by weight, in particular from 0.15 to 0.3% by weight, and they preferably have a molar mass of more than 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous. It is also possible to use a mixture of these hydrolysis stabilizers.

It was surprising that the use of masterbatch technology and of a suitable predrying and/or precrystallization process, and, where appropriate, use of small amounts of a hydrolysis stabilizer permits production of a flame-retardant and thermoformable film with the desired property profile in a cost-effective manner and without caking in the dryer, and that the film does not embrittle on exposure to heat and does not break when folded.

It was surprising that
- within the bounds of accuracy of measurement, there is no adverse effect on the Yellowness Index of the film when comparison is made with an unmodified film,
- neither any evolution of gases nor any die deposits nor any frame condensation occurs during film production, and the film therefore has excellent optical properties and exceptionally good profile, and outstanding layflat
- the flame-retardant film has excellent stretchability and can therefore be produced stably in a reliable process on high-speed film lines at speeds up to 420 m/min.

With this, such a film is also cost-effective.

It should also be emphasized that it is also possible to reuse the regrind without any adverse effect on the Yellowness Index of the film.

In the three-layer embodiment, the flame retardant is preferably present in the nonsealable outer layer C. However, if required there may also be flame retardants in the base layer B and/or also in the sealable outer layer A, and in any intermediate layers present.

Fire protection tests to DIN 4102 and the UL test has shown that in the case of a three-layer film to achieve adequate flame retardancy it is entirely sufficient for the outer layers of preferred thickness from 0.3 to 2.5 µm to have flame retardants.

Since significantly less flame retardant is needed, the flame-retardant multilayer films produced by way of known coextrusion technology are of greater economic interest than monofilms which have high concentrations throughout.

During production of the film it was found that the flame-retardant film can be produced without caking in the dryer when preferably produced by means of masterbatch technology and suitable predrying or precrystallization of the masterbatch, and using small concentrations of hydrolysis stabilizer. Furthermore, no evolution of gases or deposits were observed in the production process.

Measurements also showed that the film of the invention does not embrittle over a long period of exposure to heat at 100° C. This is surprising. These results may be attributed to the synergistic action of appropriate precrystallization, predrying, masterbatch technology, and hydrolysis stabilizer.

The film of the invention may moreover be recycled without difficulty and without pollution of the environment, and without loss of mechanical properties, and is therefore suitable for use as short-lived advertising placards, for example, or in the construction of exhibition stands, or for other promotional requisites, where fire protection is desired.

Surprisingly, films of the invention whose thickness extends to the range from 5 to 300 µm comply with the requirements for construction materials classes B2 and B1 to DIN 4102 and pass the UL 94 test.

According to the invention, the flame retardant is preferably added by way of masterbatch technology. The flame retardant is dispersed in a carrier material. Flame retardants which may be used are the respective polyester used, or else other polymers compatible therewith.

In masterbatch technology it is important that the particle size and the bulk density of the masterbatch are similar to the particle size and the bulk density of the thermoplastic, so that uniform distribution can be obtained, resulting in uniform flame retardancy.

It is important for the invention that the masterbatch which comprises the flame retardant and, where appropriate, the hydrolysis stabilizer is precrystallized or predried. This predrying includes progressive heating of the masterbatch at reduced pressure (from 20 to 80 mbar, preferably from 30 to 60 mbar, in particular from 40 to 50 mbar), with stirring, and, where appropriate, postdrying at constant, elevated temperature, again under reduced pressure. The masterbatch is preferably carried at room temperature from a feed vessel in the desired blend together with the polymers of the base and/or outer layers and, where appropriate, other raw material components batchwise into a vacuum dryer which in the course of the drying or residence time traverses a temperature program from 10 to 160° C., preferably from 20 to 150° C., in particular from 30 to 130° C. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is postdried in a downstream vessel, likewise evacuated, at from 90 to 180° C., preferably from 100 to 170° C., in particular from 110 to 160° C., for from 2 to 8 hours, preferably from 3 to 7 hours, in particular from 4 to 6 hours.

The base layer B and any intermediate layers present may also comprise conventional additives, e.g. stabilizers and/or antiblocking agents. The two outer layers A and C also comprise conventional additives, e.g. stabilizers and/or antiblocking agents. They are advantageously added to the polymer or polymer mixture before melting begins. Examples of stabilizers used are phosphorus compounds, such as phosphoric acid or phosphoric esters.

Suitable antiblocking agents (also termed pigments in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc, or manganese salts of the dicarboxylic acids used, carbon black, titanium dioxide, kaolin, or crosslinked polystyrene particles, or crosslinked acrylate particles.

Antiblocking agents used may also be a mixture of two or more different antiblocking agents or a mixture of antiblocking agents of the same makeup, but different particle size. The particles may be added to each of the layers in the respective advantageous concentrations, e.g. in the form of a glycolic dispersion during the polycondensation or by way of masterbatches during extrusion.

Preferred particles are $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, and/or particles with an average primary particle diameter above 1 μm, preferably above 1.5 μm and particularly preferably above 2 μm. However, the average particle diameter of these particles described last should not be above 5 μm.

To achieve the abovementioned properties of the sealable film, it has also proven to be appropriate to select a particle concentration in the base layer B which is lower than in the two outer layers A and C. In a three-layer film of the type mentioned the particle concentration in the base layer B will be from 0 to 0.15% by weight, preferably from 0 to 0.12% by weight and in particular from 0 to 0.10% by weight. There is no restriction in principle on the diameter of the particles used, but particular preference is given to particles with an average diameter above 1 μm.

In its advantageous usage form, the film is composed of three layers: the base layer B and, applied on both sides of this base layer, outer layers A and C, and outer layer A is sealable with respect to itself and with respect to outer layer C.

To achieve the property profile mentioned for the film, the outer layer C preferably has more pigment (i.e. a higher pigment concentration) than the outer layer A. The pigment concentration in this outer layer C is from 0.1 to 1.0% by weight, advantageously from 0.12 to 0.8% by weight and in particular from 0.15 to 0.6% by weight. In contrast, the other outer layer A, which is sealable and positioned opposite to the outer layer C, has a lower degree of filling with inert pigments. The concentration of the inert particles in layer A is from 0.01 to 0.2% by weight, preferably from 0.015 to 0.15% by weight and in particular from 0.02 to 0.1% by weight.

Between the base layer and the outer layers there may, if desired, also be intermediate layers, preferably one intermediate layer. This may again be composed of the polymers described for the base layers. In one particularly preferred embodiment, it is composed of the polyester used for the base layer. It may also comprise the additives described. The thickness of an intermediate layer is generally above 0.3 μm, preferably in the range from 0.5 to 15 μm, in particular in the range from 1.0 to 10 μm and very particularly preferably in the range from 1.0 to 5 μm.

In the particularly advantageous three-layer embodiment of the film of the invention, the thickness of the outer layers A and C is generally above 0.1 μm, and is generally in the range from 0.2 to 4.0 μm, advantageously in the range from 0.2 to 3.5 μm, in particular in the range from 0.3 to 3 μm and very particularly preferably in the range from 0.3 to 2.5 μm, and the thicknesses of the outer layers A and C may be identical or different.

The total thickness of the polyester film of the invention may vary within wide limits. It is preferably from 3 to 80 μm, in particular from 4 to 50 μm, particularly preferably from 5 to 30 μm, the layer B preferably making up from to 90% of the total thickness.

In producing the film, it is appropriate for the polymers for the base layer B and the two outer layers A and C to be introduced separately to three extruders. Any foreign bodies or contamination present may be filtered out from the polymer melt prior to extrusion. The melts are then extruded through a coextrusion die to give flat melt films, and layered one upon the other. The multilayer film is then drawn off and solidified with the aid of a chill roll and, if desired, other rolls.

The invention therefore also provides a process for producing the polyester film of the invention by the coextrusion process known per se.

The procedure for this process is that the melts corresponding to the individual layers of the film are coextruded through a flat-film die, the resultant film is drawn off for solidification on one or more roll(s), the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and the additives used may already be present in the polymer or the polymer mixture during this process. The melts are then simultaneously extruded through a flat-film die (slot die), and the extruded multilayer film is drawn off on one or more take-off rolls, whereupon it cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from about 80 to 130° C., and the transverse stretching at from about 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good sealing properties it has proven advantageous for the planar orientation Δp of the film to be equal to or less than 0.165, but particularly less than 0.163. In this case the strength of the film in the direction of its thickness is so great that when the seal seam strength is measured it is specifically the seal seam which separates, and the tear does not enter the film or propagate therein.

The significant variables affecting the planar orientation Δp have been found to be the longitudinal and transverse stretching parameters, and also the SV (standard viscosity) of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation Δp obtained with a machine is 0.167 with the following set of parameters: $\lambda_{MD}$=4.8 and $\lambda_{TD}$=4.0, a longitudinal stretching temperature $T_{MD}$ of from 80–118° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation $\Delta p$ within the desired range. The film web speed here is 340 m/min and the SV (standard viscosity) of the material is about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a temperature of from about 150 to 250° C. The film is then wound up in a usual manner.

After the biaxial stretching it is preferable for one or both surface(s) of the film to be corona- or flame-treated by one of the known methods. The intensity of the treatment generally gives a surface tension in the range above 45 mN/m.

The film may also be coated in order to achieve other desired properties. Typical coatings are layers with adhesion-promoting, antistatic, slip-improving or release action. These additional layers may, of course, be applied to the film by way of in-line coating, using aqueous dispersions, prior to the transverse stretching step.

The film of the invention has excellent sealability and very good UV resistance, and is flame-retardant and has very good handling properties and very good processing performance. The sealable outer layer A of the film seals not only with respect to itself (fin sealing) but also with respect to the nonsealable outer layer C (lap sealing). The minimum sealing temperature for the lap sealing here is only about 10° C. higher than the fin-sealing temperature, and the reduction in the seal seam strength is not more than 0.3 N/15 mm.

The gloss and haze of the film are also improved over films of the prior art. In producing the film of the invention it is certain that material for recycling can be refed to the extrusion process at a concentration of from 20 to 60% by weight, based on the total weight of the film, without any significant adverse effect on the physical properties of the film.

The excellent sealing properties, very good handling properties and very good processing properties of the film make it particularly suitable for processing on high-speed machinery.

The excellent combination of properties possessed by the film, furthermore, makes it suitable for a wide variety of different applications, for example for interior decoration, for the construction of exhibition stands or for exhibition requisites, as displays, for placards, for the protective glazing of machinery or of vehicles, in the lighting sector, in the fitting out of shops or of stores, or as a promotional requisite or laminating medium.

The good UV resistance of the transparent film of the invention moreover makes it suitable for outdoor applications, e.g. for greenhouses, roofing systems, exterior cladding, protective coverings for materials, e.g. for steel sheet, applications in the building sector and illuminated advertising profiles.

The table below (Table 1) gives once again the most important film properties according to the invention.

TABLE 1

| | Range according to the invention | Preferred | Particularly preferred | Unit | Test method |
|---|---|---|---|---|---|
| Outer layer A | | | | | |
| Minimum sealing temperature | <110 | <105 | <100 | ° C. | internal |
| Seal seam strength | >1.3 | >1.5 | >1.8 | N/15 mm | internal |
| Average roughness $R_a$ | <30 | <25 | <20 | nm | DIN 4768, cut-off 0.25 mm |
| Range of values for gas flow measurement | 500–4000 | 800–3500 | 1000–3000 | sec | internal |
| Gloss, 20° | >120 | >130 | >140 | | DIN 67 530 |
| Outer layer C | | | | | |
| COF | <0.5 | <0.45 | <0.40 | | DIN 53 375 |
| Average roughness $R_a$ | 40–100 | 45–95 | 50–90 | nm | DIN 4768, cut-off 0.25 mm |
| Range of values for gas flow measurement | <120 | <100 | <80 | sec | internal |
| Gloss, 20° | >140 | >150 | >160 | | DIN 67 530 |
| Other film properties | | | | | |
| Haze | <4 | <3 | <2.5 | % | ASTM-D 1003-52 |
| Planar orientation | <0.165 | <0.163 | <0.160 | | internal |
| Fire performance | The film complies with the requirements for construction materials classes B2 and B1 to DIN 4102 Part 2/Part 1 and passes the UL 94 test | | | | |
| Weathering test, UV resistance Change in properties[i] | <20% | | | | ISO 4892 |

[i]The films were weathered on both sides, in each case for 1000 hours per side, using the Atlas Ci 65 Weather-Ometer to the test specification ISO 4892, and then tested for mechanical properties, discoloration, surface defects, haze and gloss.

The following test methods were used to measure the properties of the raw materials and of the films:

DIN=Deutsches Institut für Normung

ISO=International Organization for Standardization

ASTM=American Society for Testing and Materials

SV (DCA), IV (DCA)

Standard viscosity SV (DCA) is measured in dichloroacetic acid by a method based on DIN 53726.

The intrinsic viscosity (IV) is calculated as follows from the standard viscosity IV (DCA)=6.67·10$^{-4}$SV·(DCA)+ 0.118

Determination of Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

Coefficient of friction was determined to DIN 53 375. The coefficient of sliding friction was measured 14 days after production.

Surface Tension

Surface tension was determined by what is known as the ink method (DIN 53 364).

Haze

Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. The reflectance was measured as an optical value characteristic of a film surface. Based on the standards ASTM-D 523-78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of Particle Sizes on Film Surfaces

A scanning electron microscope and an image analysis system were used to determine the size distribution of elevations on film surfaces. Use is made of the XL30 CP scanning electron microscope from Philips with an integrated image analysis program: AnalySIS from Soft-Imaging System.

For these measurements, specimens of film are placed flat on a specimen holder. These are then metalized obliquely at an angle "a" with a thin metallic layer (e.g. of silver). The symbol "a" here is the angle between the surface of the specimen and the direction of diffusion of the metal vapor. This oblique metalization throws a shadow behind the elevation. Since the shadows are not at this stage electrically conductive, the specimen is then further spotted or metalized with a second metal (e.g. gold), the second coating here impacting vertically onto the surface of the specimen in such a way as not to produce any shadows in the second coating.

Scanning electron microscope (SEM) images are taken of the specimen surfaces prepared in this way. The shadows of the elevations are visible because of the contrast of the metallic materials. The specimen is oriented in the SEM in such as way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 mm$^2$ is evaluated.

The height of the individual elevations is computed from the individual shadow lengths using the following relationship:

$$h=(\tan a)*L$$

where h is the height of the elevation, a is the metalization angle and L is the shadow length. The elevations recorded in this way are classified so as to arrive at a frequency distribution. The classification is into classes of 0.05 mm width between 0 and 1 mm, the smallest class (from 0 to 0.05 mm) not being used for further evaluation calculations. The diameters (dimension perpendicular to the direction of shadow throw) of the elevations are classified in a similar way in classes of 0.2 mm width from 0 to 10 mm, and here again the smallest class is used for further evaluation.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test conditions:

| | |
|---|---|
| Test area | 45.1 cm$^2$ |
| Weight applied | 1276 g |
| Air temperature | 23° C. |
| Humidity | 50% relative humidity |

-continued

| Aggregated gas volume | 1.2 cm³ |
| Pressure difference | 56 mbar |

Determination of Planar Orientation Δp

Planar orientation is determined by measuring the refractive index with an Abbe refractometer.

Preparation of specimens

Specimen size and length: from 60 to 100 mm

Specimen width: corresponds to prism width of 10 mm

To determine $n_{MD}$ and $n_a$ (=$n_z$), the specimen to be tested has to be cut out from the film with the running edge of the specimen running precisely in the direction TD. To determine $n_{MD}$ and $n_a$ (=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table. After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Surface Defects

Surface defects are determined visually.

Mechanical Properties

Modulus of elasticity, tear strength and elongation at break are measured longitudinally and transversely to ISO 527-1-2.

Weathering (on Both Sides), UV Resistance

UV resistance is tested as follows to the test specification ISO 4892

| | |
|---|---|
| Test apparatus: | Atlas Ci 65 Weather-Ometer |
| Test conditions: | Iso 4892, i.e. artificial weathering |
| Irradiation time: | 1 000 hours (per side) |
| Irradiation: | 0.5 W/m², 340 nm |
| Temperature: | 63° C. |
| Relative humidity: | 50% |
| Xenon lamp: | inner and outer filter made from borosilicate |
| Irradiation cycles: | 102 minutes of UV light, then 18 minutes of UV light with water spray on the specimens, then again 102 minutes of UV light, etc. |

Color Change

The change in color of the specimens after artificial weathering is measured using a spectrophotometer to DIN 5033.

The greater the numerical deviation from standard, the greater the color difference. Numerical values of <0.3 can be neglected and indicate that there is no significant color change.

Yellowness

The Yellowness Index (YI) is the deviation from the colorless condition in the "yellow" direction, and is measured to DIN 6167. Yellowness Index values (YI) <5 are not visually detectable.

Fire Performance

Fire performance is determined to DIN 4102 Part 2, construction materials class B2 and to DIN 4102 Part 1, construction materials class B1, and also by the UL 94 test.

EXAMPLE 1

Chips made from polyethylene terephthalate (prepared by the transesterification process with Mn as transesterification catalyst, Mn concentration: 100 ppm) were dried at 150° C. to residual moisture below 100 ppm and, together with the stated masterbatches, fed to the extruder for the base layer B. Chips made from polyethylene terephthalate were likewise fed, together with the masterbatches stated, to the extruder for the nonsealable outer layer C.

Alongside this, chips were prepared made from a linear polyester which is composed of an amorphous copolyester with 78 mol % of ethylene terephthalate and 22 mol % of ethylene isophthalate (prepared via the transesterification process with Mn as transesterification catalyst, Mn concentration: 100 ppm). The copolyester was dried at a temperature of 100° C. to a residual moisture below 200 ppm and, together with the masterbatches stated, fed to the extruder for the sealable outer layer A.

The hydrolysis stabilizer and the flame retardant are fed as a masterbatch. The masterbatch is composed of 20% by weight of flame retardant, 1% by weight of hydrolysis stabilizer, and 79% by weight of polyethylene terephthalate. The hydrolysis stabilizer is pentaerylthrityl tetrakis-3-(3,5-di-tert-butyl-4-hydroxylphenyl)propionate. The flame retardant is dimethyl phosphonate (Armgard® P 1045). The bulk density of the masterbatch is 750 kg/m$^3$ and its soft point is 69° C.

The UV stabilizer 2-(4,6-diphenyl-1,3,5-triazin-2-yl)-5-hexyloxyphenol Tinuvin® 1577) is fed in the form of masterbatches. The masterbatches are composed of 5% by weight of Tinuvin 1577 as active component and 95% by weight of polyethylene terephthalate (for outer layer C) and, respectively, 95% by weight of polyethylene isophthalate (for outer layer A). The masterbatches with 5% by weight of Tinuvin 1577 are fed only to the two thick outer layers at 20% by weight via masterbatch technology.

The masterbatches were charged at room temperature from separate metering vessels into a vacuum dryer, which from the time of charging to the end of the residence time passes through a temperature profile of from 25 to 130° C. During the residence time of about 4 hours, the mixture of both masterbatches is stirred at 61 rpm. The precrystallized or predried mixture of the masterbatches is after-dried in the downstream hopper, likewise in vacuo, at 140° C. for 4 hours.

Coextrusion, followed by stepwise longitudinal and transverse orientation, is used to produce a transparent three-layer film with ABC structure and with a total thickness of 12 µm. The thickness of each outer layer can be found in Table 2.

| Outer layer A is a mixture made from: | | |
|---|---|---|
| 20.0% | by weight of | UV masterbatch based on polyethylene isophthalate |
| 77.0% | by weight | of copolyester with an SV of 800 |
| 3.0% | by weight | of masterbatch made from 97.75% by weight of copolyester (SV of 800) and 1.0% by weight of ® Sylobloc 44 H (synthetic SiO$_2$ from Grace) and 1.25% by weight of ® Aerosil TT 600 (chain-type SiO$_2$ from Degussa) |
| Base layer B: | | |
| 90.0% | by weight | of polyethylene terephthalate with an SV of 800 |
| 10.0% | by weight | of masterbatch which comprises flame retardantand hydrolysis stabilizer |
| Outer layer C is a mixture made from: | | |
| 20.0% | by weight | of masterbatch which comprises flame retardant and hydrolysis stabilizer |
| 20.0% | by weight | of UV masterbatch based on polyethylene terephthalate |
| 48% | by weight | of polyethylene terephthalate with an SV of 800 |
| 12% | by weight | of masterbatch made from 97.75% by weight of copolyester (SV of 800) and 1.0% by weight of ® Sylobloc 44 H (synthetic SiO$_2$ from Grace) and 1.25% by weight of ® Aerosil TT 600 (chain-type SiO$_2$ from Degussa) |

The production conditions in the individual steps of the process were:

| | | | |
|---|---|---|---|
| Extrusion: | Temperatures | A layer: | 270° C. |
| | | B layer: | 290° C. |
| | | C layer: | 290° C. |
| | Die gap width: | | 2.5 mm |
| | Take-off roll Temperature: | | 30° C. |
| Longitudinal stretching: | Temperature: | | 80–125° C. |
| | Longitudinal stretching ratio: | | 4.2 |
| Transverse stretching: | Temperature: | | 80–135° C. |
| | Transverse stretching ratio: | | 4.0 |
| Heat-setting: | Temperature: | | 230° C. |
| | Duration: | | 3 s |

The film had the required good sealing properties and exhibits the desired handling properties and the desired processing performance. The film structure and the properties achieved in films prepared in this way are given in Tables 2 and 3 (CE=Comparative Example).

The films in this example, and in all of the examples below, were weathered on both sides, in each case for 1 000 hours per side, using the Atlas Ci 65 Weather-Ometer to test specification ISO 4892 and then tested for mechanical properties, discoloration, surface defects, haze and gloss (cf. Table 4).

The film complies with the requirements for construction materials classes B2 and B1 to DIN 4102 Part 2 and Part 1. The film passes the UL 94 test.

EXAMPLE 2

In comparison with Example 1, the outer layer thickness of the sealable layer A was raised from 1.5 to 2.0 µm. This has given improved sealing properties, and in particular the seal seam strength has increased markedly.

EXAMPLE 3

In comparison with Example 1, the film produced now had a thickness of 20 µm. The outer layer thickness for the sealable layer A was 2.5 µm and that for the nonsealable layer C was 2.0 µm. This has again improved sealing properties, and in particular the seal seam strength has increased markedly, and the handling properties of the film have improved slightly.

EXAMPLE 4

In comparison with Example 3, the copolymer for the sealable outer layer A has been changed. Instead of the amorphous copolyester with 78 mol % of ethylene terephthalate and 22 mol % of ethylene isophthalate, use was now made of an amorphous copolyester with 70 mol % of ethylene terephthalate and 30 mol % of ethylene isophthalate. The polymer was processed in a twin-screw vented extruder, without any need for predrying. The outer layer thickness for the sealable layer A was again 2.5 µm, and that for the nonsealable layer C was 2.0 µm. This has given improved sealing properties, and in particular the seal seam strength has increased markedly. To achieve good handling properties and good processing performance from the film, the pigment concentration in the two outer layers was raised slightly.

Comparative Example 1

In comparison with Example 1, the sealable outer layer A was now not pigmented. Although this has given some improvement in the sealing properties, the handling properties of the film and its processing performance have worsened markedly.

Comparative Example 2

In comparison with Example 1, the level of pigmentation in the sealable outer layer A was now as high as in the nonsealable outer layer C. This measure has improved the handling properties and the processing properties of the film, but the sealing properties have worsened markedly.

Comparative Example 3

In comparison with Example 1, the nonsealable outer layer C was now pigmented to a markedly lower level. The handling properties of the film and its processing performance have worsened markedly.

Comparative Example 4

Example 1 from EP-A 0 035 835 was repeated. The sealing performance of the film, its handling properties and its processing performance are markedly poorer than in the examples according to the invention.

TABLE 2

| Example | Film thickness μm | Film structure | Layer thicknesses μm A | B | C | Pigments in layers A | B | C | Average pigment diameter in layers μm A | B | C | Pigment concentrations ppm (parts by weight) A | B | C |
|---|---|---|---|---|---|---|---|---|---|---|---|---|---|---|
| E 1 | 12 | ABC | 1.5 | 9 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| E 2 | 12 | ABC | 2.0 | 8.5 | 1.5 | Sylobloc 44 H / Aerneil TT 600 | none | Sylobloc 44 H / Aerosil TT 600 | 2.5 / 0.04 | | 2.5 / 0.04 | 300 / 375 | 0 | 1200 / 1500 |
| E 3 | 20 | ABC | 2.5 | 15.5 | 2.0 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| E 4 | 20 | ABC | 2.5 | 15.5 | 2.0 | Sylobloc 44 H / Aerosil TT 600 | none | Sylobloc 44 H / Aerosil TT 600 | 2.5 / 0.04 | | 2.5 / 0.04 | 400 / 500 | 0 | 1500 / 1875 |
| CE 1 | 12 | ABC | 1.5 | 9 | 1.5 | none | none | Sylobloc 44 H / Aerosil TT 600 | | | 2.5 / 0.04 | | 0 | 1200 / 1500 |
| CE 2 | 12 | ABC | 1.5 | 9 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| CE 3 | 12 | ABC | 1.5 | 9 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 600 / 750 |
| CE 4 | 15 | AB | 2.25 | 12.75 | | Gasil 35 EP-A 0 035 835 | none | | 3 | | | 2500 | 0 | |

TABLE 3

| Example | Minimum sealing temperature °C. A side with respect to A side | Seal seam strength N/15 mm A side with respect to A side | Coefficient of friction COF C side with respect to C side | Average roughness $R_a$ nm A side | C side | Values measured for gas flow sec A side | C side | Constants A/B A side | C side | Δp | Gloss 20° C. A side | C side | Haze | Winding performance and handling properties | Processing performance |
|---|---|---|---|---|---|---|---|---|---|---|---|---|---|---|---|
| E 1 | 100 | 2.0 | 0.45 | 25 | 65 | 1200 | 80 | 0.5 | 3.06 | 0.165 | 140 | 170 | 2.5 | ++ | ++ |
| E 2 | 98 | 2.7 | 0.45 | 26 | 65 | 1280 | 80 | 0.5 | 3.06 | 0.165 | 140 | 170 | 2.5 | ++ | ++ |
| E 3 | 95 | 3.0 | 0.41 | 23 | 61 | 1110 | 80 | 0.5 | 3.06 | 0.165 | 130 | 170 | 3.0 | ++ | ++ |
| E 4 | 85 | 3.3 | 0.40 | 23 | 65 | 1300 | 60 | 0.5 | 3.06 | 0.165 | 130 | 170 | 3.0 | ++ | ++ |
| CE 1 | 98 | 2.1 | 0.45 | 10 | 65 | 10000 | 80 | | | 0.165 | 160 | 170 | 1.5 | − | − |
| CE 2 | 110 | 1.0 | 0.45 | 65 | 65 | 80 | 80 | | | 0.165 | 130 | 170 | 2.8 | − | − |
| CE 3 | 100 | 2.0 | 0.45 | 25 | 37 | 1200 | 150 | | | 0.165 | 160 | 190 | 1.5 | − | − |
| CE 4 | 115 | 0.97 | >2 | 70 | 20 | 50 | >5000 | | | | | | 12 | − | − |

Key to winding performance, handling properties and processing performance of films:
++: no tendency to adhere to rolls or other mechanical parts, no blocking problems on winding or during processing on packaging machinery, low production costs
−: tendency to adhere to rolls or other mechanical parts, blocking problems on winding and during processing on packaging machinery, high production costs due to complicated handling of film in machinery

TABLE 4

| Example | Weathering | Modulus of elasticity N/mm² longitudinal | Modulus of elasticity N/mm² transverse | Tensile stress at break N/mm² longitudinal | Tensile stress at break N/mm² transverse | Tensile strain at break % longitudinal | Tensile strain at break % transverse | Total discoloration value E | Surface defects | Gloss A side | Gloss C side | Haze |
|---|---|---|---|---|---|---|---|---|---|---|---|---|
| E 1 | Before | 4300 | 5800 | 220 | 280 | 170 | 100 | | | 140 | 170 | 2.5 |
| | After | 4100 | 5280 | 190 | 270 | 150 | 90 | 0.2 | none | 132 | 165 | 2.8 |
| E 2 | Before | 4200 | 5600 | 215 | 260 | 170 | 100 | | | 140 | 170 | 2.5 |
| | After | 4030 | 5400 | 190 | 250 | 150 | 90 | 0.25 | none | 138 | 165 | 2.8 |
| E 3 | Before | 4500 | 5700 | 230 | 280 | 175 | 105 | | | 130 | 170 | 3.0 |
| | After | 4000 | 5350 | 196 | 255 | 150 | 89 | 0.24 | none | 138 | 155 | 3.7 |
| E 4 | Before | 4300 | 5800 | 220 | 275 | 178 | 111 | | | 130 | 170 | 3.0 |
| | After | 3900 | 5360 | 192 | 248 | 148 | 92 | 0.27 | none | 138 | 165 | 3.5 |

The invention claimed is:

1. A polyester film which has a base layer B made from a thermoplastic polyester, and has a sealable outer layer A and, on the other side of the base layer, a nonsealable outer layer C, where the outer layers A and C comprise at least one antiblocking agent, and which film comprises at least one UV absorber and at least one flame retardant, where the sealable outer layer A has a minimum sealing temperature of less than 110° C. and has a seal seam strength of at least 1.3 N/15 mm, wherein said sealable outer layer A has a roughness value, $R_a$, of less than 30 nm.

2. The polyester film as claimed in claim 1, which further comprises an intermediate layer between base layer B and outer layer A or between base layer B and outer layer C or between base layer B and outer layer A and between base layer B and outer layer C.

3. The polyester film as claimed in claim 1, which has an A-B-C layer structure.

4. The polyester film as claimed in claim 1, wherein the base layer is composed of at least about 90% by weight of a thermoplastic polyester.

5. The polyester film as claimed in claim 4, wherein the thermoplastic polyester is polyethylene terephthalate or a polyester which is composed of at least about 90 mol % of units of ethylene glycol and of terephthalic acid or of at least about 90 mol % of units of ethylene glycol and of naphthalene-2,6-dicarboxylic acid.

6. The polyester film as claimed in claim 1, wherein the outer layer A comprises a polyester which is composed mainly of units of isophthalic acid, of terephthalic acid, and of ethylene glycol.

7. The polyester film as claimed in claim 1, wherein the outer layer A comprises a polyester which is composed of from about 40 to about 95 mol %, of units of ethylene terephthalate, and the remainder to give about 100 mol % is composed of units of ethylene isophthalate.

8. The polyester film as claimed in claim 7, wherein the outer layer A comprises a polyester which is composed of from about 50 to about 95 mol %, of units of ethylene terephthalate, and the remainder to give about 100 mol % is composed of units of ethylene isophthalate.

9. The polyester film as claimed in claim 7, wherein the outer layer A comprises a polyester which is composed of from about 60 to about 85 mol %, of units of ethylene terephthalate, and the remainder to give about 100 mol % is composed of units of ethylene isophthalate.

10. The polyester as claimed in claim 1, wherein no antiblocking agents are present in the base layer B or the concentration of antiblocking agent in the base layer B is lower than in the outer layers A and C.

11. The polyester as claimed in claim 1, wherein the concentration of antiblocking agent in the nonsealable outer layer C is higher than in the sealable outer layer A.

12. The polyester as claimed in claim 1, wherein the concentration of antiblocking agent is from 0 to about 0.15% by weight in the base layer B, from about 0.1 to about 1% by weight in the outer layer C, and from about 0.01 to about 0.2% by weight in the outer layer A.

13. The polyester film as claimed in claim 1, wherein the average particle diameter of the antiblocking agents is smaller than about 100 nm or greater than about 1 μm or smaller than about 100 nm and greater than about 1 μm.

14. The polyester film as claimed in claim 1, wherein the antiblocking agent comprises $SiO_2$.

15. The polyester film as claimed in claim 1, wherein the outer layers have identical or different thickness, which is from about 0.2 to about 4.0 μM.

16. The polyester film as claimed in claim 15, wherein the outer layers have identical or different thickness, which is from about 0.3 to about 3 μm.

17. The polyester film as claimed in claim 15, wherein the outer layers have identical or different thickness, which is from about 0.3 to about 2.5 μm.

18. The polyester film as claimed in claim 1, wherein the UV absorber or the flame retardant or the UV absorber and the flame retardant is or are present in the base layer or the outer layers or the base layer and the outer layers.

19. The polyester film as claimed in claim 1, wherein the flame retardant comprises organophosphorus compounds or a mixture of organophosphorus compounds, and the UV absorber comprises 2-hydroxybenzotriazols or triazines, or a mixture of these UV absorbers.

20. The polyester film as claimed in claim 1, wherein the UV absorber comprises 2-(4,6-diphenyl-1,3,5-triazin-2-yl)-5-(hexyl)oxyphenol or 2,2'-methylenebis-6-(2H-benzotriazol-2-yl)-4-(1,1,2,2-tetramethylpropyl)phenol or a mixture of these UV absorbers or a mixture of one or more of these Lw absorbers with other UV absorbers.

21. The polyester film as claimed in claim 1, wherein the concentration of the UV absorber or UV absorbers is from about 0.01 to about 5% by weight, based on the weight of the respective layer in which it is present.

22. The polyester film as claimed in claim 1, wherein the flame retardant is soluble in the thermoplastic polyester in which it is present.

23. The polyester film as claimed in claim 1, wherein the flame retardant comprises dimethyl methylphosphonate or a mixture of organophosphorus compounds.

24. The polyester film as claimed in claim 1, wherein the concentration of the flame retardant or flame retardants is from about 0.5 to about 30% by weight, based on the weight of the respective layer in which it is present.

25. The polyester film as claimed in claim 1, wherein the concentration of the flame retardant or flame retardants is from about 1 to about 20% by weight, based on the weight of the respective layer in which it is present.

26. The polyester film as claimed in claim 1, which comprises at least one hydrolysis stabilizer.

27. The polyester film as claimed in claim 26, wherein the concentration of the hydrolysis stabilizer is from about 0.1 to about 1% by weight, based on the weight of the respective layer in which it is present.

28. A process for producing a polyester film as claimed in claim 1, which comprises the steps of coextruding, through a coextrusion die, the starting materials required for the production of the base and outer layers, and biaxially orienting and heat-setting the resultant film.

29. The process as claimed in claim 28, wherein the flame retardant or the UV absorber or the flame retardant and the UV absorber are added by way of masterbatch technology.

30. A method of making an interior decoration or a construction of an exhibition stand or a display or a placard or a protective glazing or a shop outfit or a promotional requisite or a laminating medium which method comprises converting a polyester film as claimed in claim 1 into an interior decoration or a construction of an exhibition stand or a display or a placard or a protective glazing or a shop outfit or a promotional requisite or a laminating medium.

31. A polyester film which has a base layer B made from a thermoplastic polyester, and has a sealable outer layer A comprising polyester copolymer consisting essentially of isophthalic acid units, terephthalic acid units and ethylene glycol units and, on the other side of the base layer, a nonsealable outer layer C, where the outer layers A and C comprise at least one antiblocking agent, and which film comprises at least one UV absorber and at least one flame retardant, where the sealable outer layer A has a minimum sealing temperature of less than 110° C. and has a seal seam strength of at least 1.3 N/15 mm, wherein said sealable outer layer A has a roughness value, $R_a$, of less than 30 nm.

32. A polyester film according to claim 1, wherein said nonsealable outer layer C has a roughness value, $R_a$, ranging from 40 to 100 nm.

* * * * *

UNITED STATES PATENT AND TRADEMARK OFFICE
CERTIFICATE OF CORRECTION

| | | |
|---|---|---|
| PATENT NO. | : 7,157,132 B2 | Page 1 of 1 |
| APPLICATION NO. | : 10/182538 | |
| DATED | : January 2, 2007 | |
| INVENTOR(S) | : Murschall et al. | |

It is certified that error appears in the above-identified patent and that said Letters Patent is hereby corrected as shown below:

Column 24
Claim 15, line 38, delete "µM" insert -- µm --

Column 24
Claim 20, line 60, delete " Lw " insert --UV--

Signed and Sealed this

Sixth Day of March, 2007

JON W. DUDAS
*Director of the United States Patent and Trademark Office*